(12) United States Patent
Jeong et al.

(10) Patent No.: US 10,827,379 B2
(45) Date of Patent: Nov. 3, 2020

(54) TERMINAL DEVICE, BASE STATION DEVICE, AND METHOD FOR CONTROLLING QOS

(71) Applicant: SK TELECOM CO., LTD., Seoul (KR)

(72) Inventors: Sang Soo Jeong, Seoul (KR); Jong Han Park, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/238,238

(22) PCT Filed: Feb. 28, 2017

(86) PCT No.: PCT/KR2017/002185
§ 371 (c)(1),
(2) Date: Jan. 2, 2019

(87) PCT Pub. No.: WO2018/079948
PCT Pub. Date: May 3, 2018

(65) Prior Publication Data
US 2019/0268798 A1    Aug. 29, 2019

(30) Foreign Application Priority Data
Oct. 26, 2016   (KR) .................. 10-2016-0140161

(51) Int. Cl.
*H04W 28/02* (2009.01)
*H04W 72/14* (2009.01)
(Continued)

(52) U.S. Cl.
CPC ....... *H04W 28/0268* (2013.01); *H04W 28/02* (2013.01); *H04W 28/06* (2013.01); *H04W 72/12* (2013.01); *H04W 72/14* (2013.01)

(58) Field of Classification Search
CPC . H04W 28/0268; H04W 72/14; H04W 28/06; H04W 72/12; H04W 28/02
See application file for complete search history.

(56) References Cited

U.S. PATENT DOCUMENTS

2007/0206545 A1    9/2007   Lee et al.
2011/0255502 A1*  10/2011   Shen ............... H04W 72/1242
                                                         370/329
(Continued)

FOREIGN PATENT DOCUMENTS

JP    2002027535 A    1/2002
JP    2010045795 A    2/2010
(Continued)

OTHER PUBLICATIONS

Japanese Office Action dated Oct. 8, 2019 in connection with the Japanese Patent Application No. 2019-528005.
(Continued)

*Primary Examiner* — Brenda H Pham
(74) *Attorney, Agent, or Firm* — Hauptman Ham, LLP (57) ABSTRACT

Disclosed are a terminal apparatus, a BS apparatus, and a QoS control method for realizing a service flow-based QoS control without an increase in complexity compared to the conventional bearer-based QoS control method and improving a response time of a service request by making a QoS control for an initial service flow generated according to the service request possible.

18 Claims, 5 Drawing Sheets

(51) Int. Cl.
*H04W 28/06* (2009.01)
*H04W 72/12* (2009.01)

(56) References Cited

U.S. PATENT DOCUMENTS

| | | | | |
|---|---|---|---|---|
| 2014/0140213 | A1* | 5/2014 | Raleigh | H04L 43/0888 370/235 |
| 2017/0251491 | A1* | 8/2017 | Qiang | H04L 1/1896 |

FOREIGN PATENT DOCUMENTS

| | | |
|---|---|---|
| JP | 2010504712 A | 2/2010 |
| JP | 2016063541 A | 4/2016 |
| KR | 10-2010-0112158 A | 10/2010 |
| KR | 10-1652442 B1 | 8/2016 |
| WO | 2009-073279 A2 | 6/2009 |
| WO | 2016-003140 A1 | 1/2016 |
| WO | 2016-091298 A1 | 6/2016 |

OTHER PUBLICATIONS

The extended European Search Report dated Jan. 3, 2020 in connection with the counterpart European Patent Application No. 17865778.9.
Intel et al., Update to Solution 2.2, S WG2 Meeting #116, Jul. 11-15, 2016, Vienna, AT.
Intel Corporation, Use of bearers and QoS support in NR, 3GPP TSG RAN WG2 Meeting #93bis, Apr. 11-15, 2016, Dubrovnik, Croatia.
Korean Office Action for corresponding Korean application No. 10-2016-0140161 dated Nov. 7, 2019.
Korean Office Action for corresponding Korean application No. 10-2018-0076742 dated Nov. 6, 2019.
International Search Report dated Jul. 21, 2017, corresponding to International Application No. PCT/KR2017/002185.

* cited by examiner

[BS apparatus]

TERMINAL DEVICE, BASE STATION DEVICE, AND METHOD FOR CONTROLLING QOS

CROSS-REFERENCE TO RELATED APPLICATIONS

The present application is a continuation of International Application No. PCT/KR2017/002185 filed on Feb. 28, 2017, which is based on, and claims priority from, Korean Patent Application No. 10-2016-0140161, filed on Oct. 26, 2016, the entire contents of which are incorporated herein by reference.

BACKGROUND OF THE INVENTION

1. Field of the Invention

The present disclosure relates to a method of realizing a service flow-based QoS control without an increase in complexity compared to a conventional bearer-based QoS control method and enabling a QoS control for an initial service flow generated according to a service request to improve a response time of the service request.

2. Description of the Prior Art

In a mobile communication system, a Quality of Service (QoS) level varies depending on the media type of application service used by a terminal apparatus (user), and a QoS control for transmitting a packet of the application service with a guaranteed QoS level suitable for the media type is provided.

In connection with this, the QoS control method provided by an LTE network is an EPS bearer (hereinafter, referred to as a bearer) based QoS control method.

In the LTE network, the terminal apparatus (user) generates an EPS bearer, that is, a bearer for transmitting data to use an application service.

The bearer may be a tunnel (a radio section+a wired section) generated between the terminal apparatus and a P-GW via the wireless section connecting the terminal apparatus and a BS device and the wired section connecting the BS device, an S-GW, and the P-GW.

Data of the terminal apparatus is transmitted in the form of an IP-based packet through the tunnel, that is, the bearer, and a traffic flow according to packet transmission is referred to as a service flow.

Conventionally, types of application services provided to the terminal apparatus were relatively limited and thus a bearer-based QoS control method of grouping several types of application services and applying the QoS based on a logical unit of "bearers" is used.

Accordingly, the conventional bearer-based QoS control method defines a QoS level (QoS parameter) for each bearer and guarantees (applies) the QoS based on bearers, so that service flows transmitted through one bearer are all applied and transmitted with the same QoS (QoS level of the bearer).

As a result, the conventional bearer-based QoS control method has an advantage in that complexity of the QoS control can be reduced but has a limit in that different QoS cannot be applied to service flows belonging to one bearer.

The limit is not a big problem in a situation in which types of application services are relatively limited. However, the limit may be a problem which should be solved in a current or future situation (for example, 5G) where various types of application services are developed/introduced rapidly.

Therefore, an aspect of the present disclosure is to implement the service flow-based QoS control for enabling more differential QoS application without an increase in complexity compared to the conventional bearer-based QoS control method and put a priority to a service request for improving a response time of the service request.

SUMMARY OF THE INVENTION

The aspect of the present disclosure is to realize a service flow-based QoS control for enabling more differential QoS application without an increase in complexity compared to the conventional bearer-based QoS control method and to improve a response time of a service request by putting a priority to the service request.

In accordance with an aspect of the present disclosure, a terminal apparatus is provided. The terminal apparatus includes: an acquisition unit configured to acquire first Quality of Service (QoS) control information from a core network according to establishment of a session with the core network; an identification unit configured to identify an identification code of a particular application from the first QoS control information when a service flow for transmitting an uplink packet in the particular application is initially generated; and a transmission unit configured to transmit an uplink grant request including the identification code of the particular application to a Base Station (BS) apparatus, thereby allowing the BS apparatus to process the uplink grant, based on a priority of an application level identified by the identification code of the particular application.

Specifically, the identification code of the particular application may include a substitution code which replaces identification information (APP ID) predefined for the particular application with a code value within a threshold size.

Specifically, the terminal apparatus may further include, when second QoS control information is acquired from a header of a downlink packet received from the BS apparatus in connection with the service flow, a processing unit configured to apply a particular QoS parameter identified from the second QoS control information to the service flow to allow an uplink packet in the service flow to be transmitted with a QoS according to the particular QoS parameter.

In accordance with another aspect of the present disclosure, a Base Station (BS) apparatus is provided. The BS apparatus includes: an acquisition unit configured to acquire first Quality of Service (QoS) from a core network according to establishment of a session between a terminal apparatus and the core network; and a processing unit configured to, when an uplink grant request including an identification code of a particular application is received from the terminal apparatus according to a service flow for transmitting an uplink packet of the particular application being initially generated by the terminal apparatus, process the uplink grant based on a priority according to an application level identified by the identification code of the particular application within the first QoS control information.

Specifically, the identification code of the particular application may include a substitution code which replaces identification information (APP ID) predefined for the particular application with a code value within a threshold size.

Specifically, when second QoS control information is acquired from a header of a downlink packet received from the core network in connection with the service flow, the processing unit may be configured to apply a particular QoS parameter identified from the second QoS control information to the service flow to allow the downlink packet to be transmitted to the terminal apparatus with a QoS according to the particular QoS parameter.

Specifically, the processing unit may be configured to insert the second QoS control information into the header of the downlink packet to be transmitted to the terminal apparatus, thereby allowing the terminal apparatus to transmit the uplink packet in the service flow with the QoS according to the particular QoS parameter.

In accordance with another aspect of the present disclosure, a method of controlling a QoS is provided. The method includes: an acquisition step of acquiring first Quality of Service (QoS) control information from a core network according to establishment of a session with the core network by a terminal apparatus; an identification step of identifying an identification code of a particular application from the first QoS control information by the terminal apparatus when a service flow for transmitting an uplink packet in the particular application is initially generated; and a transmission step of transmitting an uplink grant request including a QoS parameter of the particular application to a Base Station (BS) apparatus, thereby allowing the BS apparatus to process the uplink grant, based on a priority according to an application level identified by the identification code of the particular application by the terminal apparatus.

Specifically, the identification code of the particular application may include a substitution code which replaces identification information (APP ID) predefined for the particular application with a code value within a threshold size.

Specifically, the method may further include a processing step of, when second QoS control information is acquired from a header of a downlink packet received from the BS apparatus in connection with the service flow, applying a particular QoS parameter identified from the second QoS control information to the service flow to allow the uplink packet in the service flow to be transmitted with a QoS according to the particular QoS parameter by the terminal apparatus.

In accordance with another aspect of the present disclosure, a method of controlling a QoS is provided. The method includes: an acquisition step of acquiring first Quality of Service (QoS) control information from a core network according to establishment of a session between a terminal apparatus and the core network by a Base Station (BS) apparatus; a reception step of, when a service flow for transmitting an uplink packet of a particular application is initially generated by the terminal apparatus, receiving an uplink grant request including an identification code of the particular application from the terminal apparatus by the BS apparatus; and a processing step of processing the uplink grant, based on a priority according to an application level identified by the identification code of the particular application within the first QoS control information by the BS apparatus.

Specifically, the identification code of the particular application may include a substitution code which replaces identification information (APP ID) predefined for the particular application with a code value within a threshold size.

Specifically, the method may further include a transmission step of, when second QoS control information is acquired from a header of a downlink packet received from the core network in connection with the service flow, applying a particular QoS parameter identified from the second QoS control information to the service flow to allow the downlink packet to be transmitted to the terminal apparatus with a QoS according to the particular QoS parameter by the BS apparatus.

Specifically, the transmission step may include inserting the second QoS control information into the header of the downlink packet to be transmitted to the terminal apparatus, thereby allowing the terminal apparatus to transmit the uplink packet in the service flow with the QoS according to the particular QoS parameter.

In accordance with another aspect of the present disclosure, a terminal apparatus is provided. The terminal apparatus includes: an acquisition unit configured to acquire control information from a core network; an identification unit configured to identify information related to a particular application from the control information when a service flow for transmitting an uplink packet in the particular application is initially generated; and a transmission unit configured to transmit an uplink grant request including the information related to the particular application to a Base Station (BS) apparatus, thereby allowing the BS apparatus to process the uplink grant based on the information related to the particular application.

Specifically, the control information may comprise at least one of mapping information for mapping identification information of an application to a priority of the application and replacing information for replacing the identification information of the application into a substitution code within a threshold size.

Specifically, the information related to the particular application may comprise at least one of a priority of the particular application and a substitution code of the particular application within the threshold size.

Specifically, the priority of the particular application may be identified from the identification information of the particular application using the mapping information of the control information, and the substitution code of the particular application may be identified by replacing the identification information of the particular application into the substitution code of the particular application using the replacing information of the control information.

According to the terminal apparatus and the BS apparatus according to the present disclosure, it is possible to derive effects of applying differential QoS, that is, service qualities to respective communication services by enabling the service flow-based QoS control without an increase in complexity compared to the conventional bearer-based QoS control method is obtained.

Further, the present disclosure can derive effects of increasing a service quality which a user experiences by improving a response time of a service request through enabling the QoS control of an initial service flow generated according to the service request.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

The QoS control method proposed by the present disclosure may derive the following effects.

That is, according to the present disclosure, there are noticeable effects in that application services having different service requirements can receive different QoS by controlling the QoS based on the service flow instead of the conventional bearer and in that control signaling can be minimized through a reflective QoS control method of applying, to an uplink, the same QoS parameter applied to a downlink when the service flow-based QoS control is implemented.

Further, according to the present disclosure, there are noticeable effects in that a response time of a service request can be improved by realizing a QoS control for an uplink corresponding to an initial service request, which has not been available to QoS control, and in that resource use efficiency can be maximized and exposure of a QoS control policy to the outside can be prevented by replacing application identification information required for the QoS control of the initial service request with a short (small) identification code.

Hereinafter, the service flow-based QoS control method proposed by the present disclosure and an apparatus and a configuration for implementing the same will be described with reference to the accompanying drawings, and the achieved effects will be described in more detail.

Embodiments of the present disclosure will be described on the basis of a 4G (LTE/EPC) system or a 5G (next generation) system, but the main subject of the present disclosure is not limited to a particular communication system and may be applied to any system having a similar configuration. Further, steps of embodiments of the present disclosure may be changed in sequence or some steps may be omitted.

Figure 1:
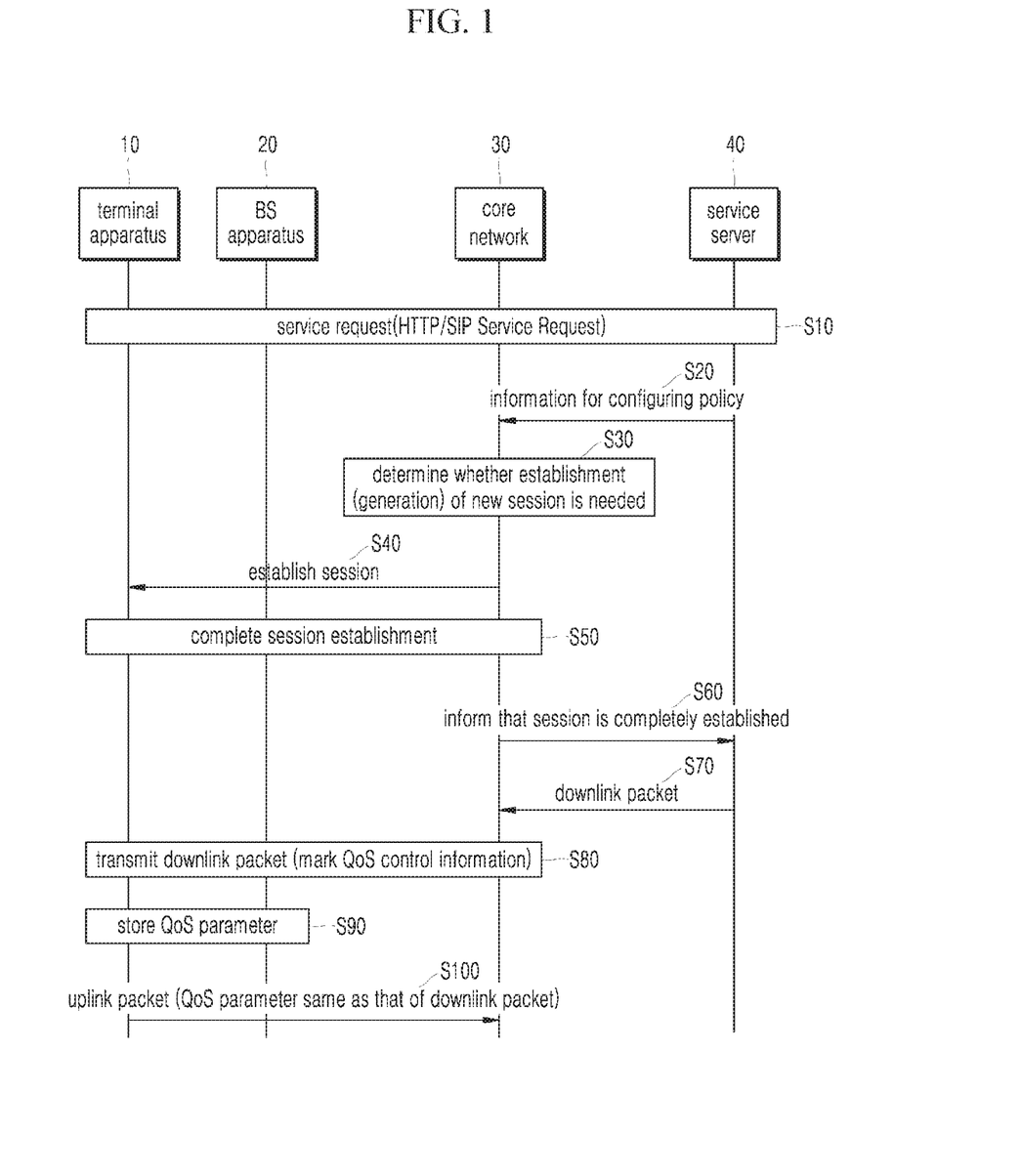
FIG. 1 is a flowchart illustrating a reflective QoS control method according to an embodiment of the present disclosure.

First, an operation flow of the service flow-based QoS control realized through a reflective QoS control method according to an embodiment of the present disclosure will be described with reference to FIG. 1.

A terminal apparatus 10 transfers a service request to a service server 50 in order to receive a new service in step S10.

At this time, a service request message is a message generated on an application layer and transmitted to a user plane. The service request message uses an HTTP or a SIP.

Subsequently, the service server 50 transfers information for configuring a policy of the service to a core network 30 in response to the service request from the terminal 10 in step S20.

At this time, the message may include, for example, a service name (PDU name), information (continuity flag) on whether session continuity is needed, and information (flow descriptor, for example, an IP address, a port, and QoS control information) related to a service flow.

Then, the core network 30 determines whether establishment (generation) of a new session (PUD session) with the terminal apparatus 10 is needed on the basis of information received from the service server 50 in S30.

When it is determined that the generation of the new session is needed, the core network 30 performs a process for establishing the session with the terminal apparatus 10.

At this time, the core network 30 transfers information on whether session continuity is supported to the terminal apparatus 10 and a Base Station (BS) apparatus 20.

Here, the terminal apparatus 10 and the BS apparatus 20 perform different operations according to whether the session continuity is supported.

When the session continuity is not needed, the terminal apparatus 10 and the BS apparatus 20 do not perform an operation for a handover, that is, an operation for preparing the case in which an accessed cell is changed while a session is established and a service is provided The operation for the handover includes a measurement configuration and report process in which the terminal apparatus 10 periodically measures intensities of signals of neighboring cells and reports the measured signal intensities to the BS.

In contrast, when the session continuity is needed, the terminal apparatus 10 and the BS apparatus 20 perform the operation for the handover, that is, the operation for preparing the case in which the accessed cell is changed.

Accordingly, the terminal apparatus 10, the BS apparatus 20, and the core network 30 perform the remaining processes for establishing the session in step S50.

When the session establishment is completed, the core network 30 informs the service server 50 that the session establishment is completed in step S60.

Then, the service server 50 transmits service traffic, that is, a downlink packet to the core network 30 in step S70.

When receiving the downlink packet, the core network 30 inserts (marks) QoS control information into a header of the downlink packet and transfers the downlink packet to the terminal apparatus 10 and the BS apparatus 20 in step S80.

At this time, a QoS parameter identified from the QoS control information is a value indicating a priority of a packet service flow, and the BS apparatus performs scheduling of the downlink packet and resource allocation based on the QoS parameter.

Thereafter, the terminal apparatus 10 and the BS apparatus 20 use the QoS control information included in the header of the downlink packet, thereby the same QoS parameter as that applied to the downlink packet being applied to an uplink packet in the same service flow, so as to process an uplink grant with the same priority in steps S90 and S100.

As described above, through the reflective QoS control method according to an embodiment of the present disclosure, it is possible to realize the service flow-based QoS control and also minimize signaling according to the QoS control by applying, to the uplink, the same QoS parameter as that applied to the downlink.

However, according to the reflective QoS control method described with reference to FIG. 1, it may be identified that there is no QoS control information that can be applied to the service request in step S10.

When there is no the QoS control information that can be applied to the service request, it is not possible to control a QoS for an uplink packet corresponding to an initial service request.

Since the reflective QoS control applies a QoS to uplink packets belonging to the same service flow when one or more downlink packets are generated, there is no QoS information that can be applied to a first uplink packet which the terminal apparatus transmits to make a request for a service when the downlink packet is generated after the terminal apparatus makes a request for a service (generally a UE-initiated service or a mobile originating service).

When transmission of the uplink packet is processed with a lower priority than other packets since there is no QoS information that can be applied to the first uplink packet (service request message) which the terminal apparatus transmits to make a request for a service, the service request message is not transmitted for a long time and thus a service quality which the user experiences may deteriorate.

In order to solve the problem, the service flow-based QoS control method according to the present disclosure proposes a scheme of applying QoS control information to a service flow initially generated to make a request for the service by the terminal apparatus 10.

That is, in the service flow-based QoS control method according to the present disclosure, the core network 30 transfers, to the terminal apparatus 10 and the BS apparatus 20, QoS control information that can be applied unconditionally to an initial service flow in a process of establishing a session between the terminal apparatus 10 and the core network 30.

Accordingly, when the initial service flow is generated, the terminal apparatus 10 and the BS apparatus 20 receiving the QoS control information that can be applied unconditionally to the initial service flow process an uplink grant requested from the terminal apparatus 10 according to the generation of the initial service flow on the basis of the QoS control information received from the core network.

Here, processing the uplink grant may be understood that the BS apparatus 20 performs resource allocation and scheduling for the uplink packet of which transmission is requested from the terminal apparatus 10.

However, when the QoS control information is applied unconditionally to the initial service flow, it may be expected that the QoS control can be performed for the uplink packet but a differential QoS control cannot be performed between service flows.

A service flow for a particular application has a relatively high priority of a service request even though the service flow is an initial service flow.

For example, it is because the service flow has a high grade according to application service subscription information, importance of an application service is high (for example, emergency/disaster safety situation), or the priority may be high according to section of a service provider.

Accordingly, an embodiment of the present disclosure proposes a method of processing a service request generated by the terminal 10 on the basis of a priority in order to solve the limit.

An operation flow in the QoS control method for a service request according to an embodiment of the present disclosure will be described with reference to FIG. 2.

First, the terminal apparatus 10 acquires QoS control information for an initial service flow from the core network 30 in a process of establishing a session with the core network 30 in steps S110 and S120.

The terminal apparatus 10 stores the received (acquired) QoS control information in step S130.

At this time, the QoS control information may include at least one of application identification information (APP ID) and an application level identified by the application identification information (APP ID).

Here, the application identification information is a value uniquely applied to each application in an OS or platform, and the application level is associated with a priority of a service request for each application.

When a service flow for transmitting an uplink packet in a particular application is initially generated, the terminal apparatus 10 makes a request for an uplink grant to the BS apparatus 20 by applying stored QoS control information in step S140.

At this time, the terminal apparatus 10 may make a request for the uplink grant by identifying the particular application in which the service flow is generated and transmitting identification information of the particular application to the BS apparatus 20 or a level of an application identified by the identification information of the particular application to the BS apparatus 20.

For reference, when the particular application in which the service flow is generated is identified, the terminal apparatus 10 may make a request for the uplink grant to the BS apparatus 20 with a priority according to the level of the application identified by the identification information of the particular application.

When the identification information of the particular application is received to from the terminal apparatus 10, the BS apparatus 20 may process the uplink grant on the basis of the priority according to the level of the application identified by the identification information of the particular application in steps S150 and S160.

Alternatively, the BS apparatus 20 may process the uplink grant with the priority according to the level of the particular application received from the terminal apparatus 10 in steps S150 and S160.

Here, in order that the BS apparatus 20 processes the uplink grant on the basis of the priority according to the level of the application identified by identification information of the particular application received from the terminal apparatus 10, it should be assumed that QoS control information including the application identification information (APP ID) and the level of the application identified by the application identification information (APP ID) is pre-stored in the BS apparatus 20.

As described above, through the QoS control method for the service request according to an embodiment of the present disclosure, an uplink grant of even an initial service flow is processed according to a priority for each application determined by QoS control information, so that the differential QoS control between service flows is possible.

Figure 2:
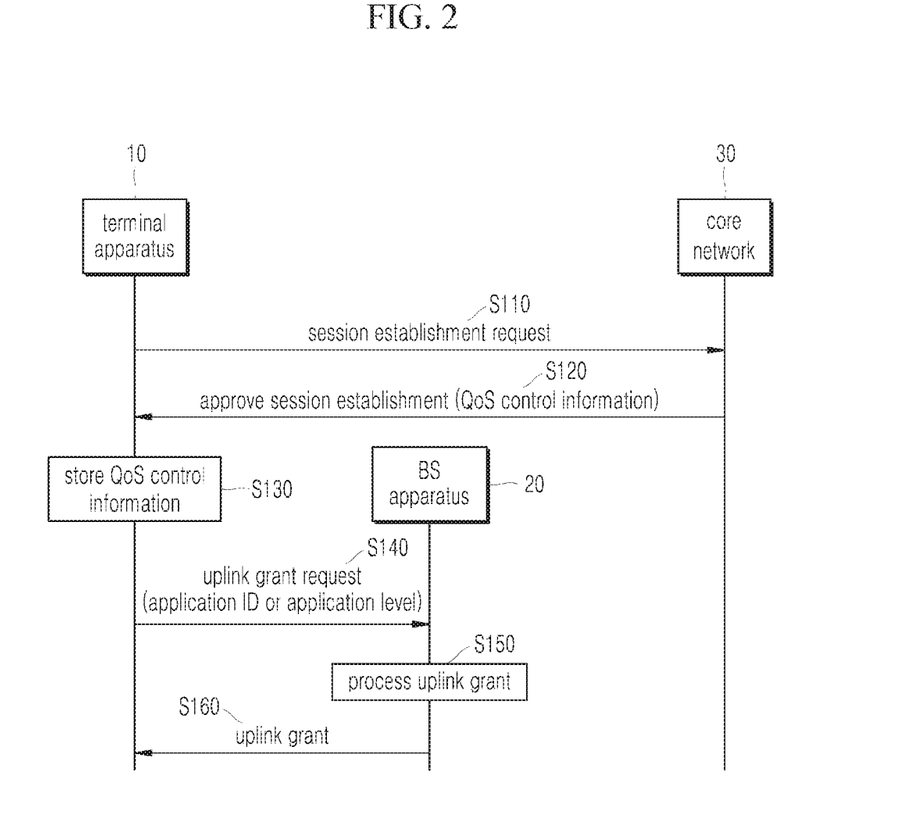
FIG. 2 is a flowchart illustrating a QoS control method for a service request according to an embodiment of the present disclosure.

Meanwhile, in the above description made with reference to FIG. 2, the terminal apparatus 10 transfers the identification information of the particular application or the level of the particular application to the BS apparatus 20 when the uplink grant is requested in step S140.

However, if identification information of application with a long length (large size) is transmitted to the BS apparatus 20 whenever the uplink grant is requested, control waste may be serious.

When the level of the application is directly transmitted to the terminal apparatus 10, it is likely to leak the level of the application to the outside. Further, when the terminal apparatus 10 is hacked/falsified, there is a limit in that an application at a low level is falsified to an application at a high level and thus the uplink grant may be requested according to the high level.

Accordingly, in order to solve the limit, an embodiment of the present disclosure proposes a method of using an application identification code, which is a substitution code generated by replacing the application identification information with a code value (having a short length) within a threshold size through, for example, a mapping table shown in [Table 1] below.

The application identification code according to an embodiment may have a length shorter than application identification information, and the application identification information and the identification code may have 1:1 relationship or N:1 relationship.

In the latter case, two or more pieces of application identification information correspond to one identification code and, at this time, two applications have the same uplink level.

TABLE 1

| Application identification information (APP ID) | Identification code |
|---|---|
| APP ID #1 | Code #1 |
| APP ID #2 | Code #2 |
| . . . | . . . |

Meanwhile, the relationship between the application identification information and the identification code may be implemented by explicit mapping information like the mapping table or may be defined in the form of a hash function.

For example, when it is defined that a hash function is F(x) and x is an input value (application identification information), an output value (identification code) may be acquired in the form of Y=F(x).

Figure 3:
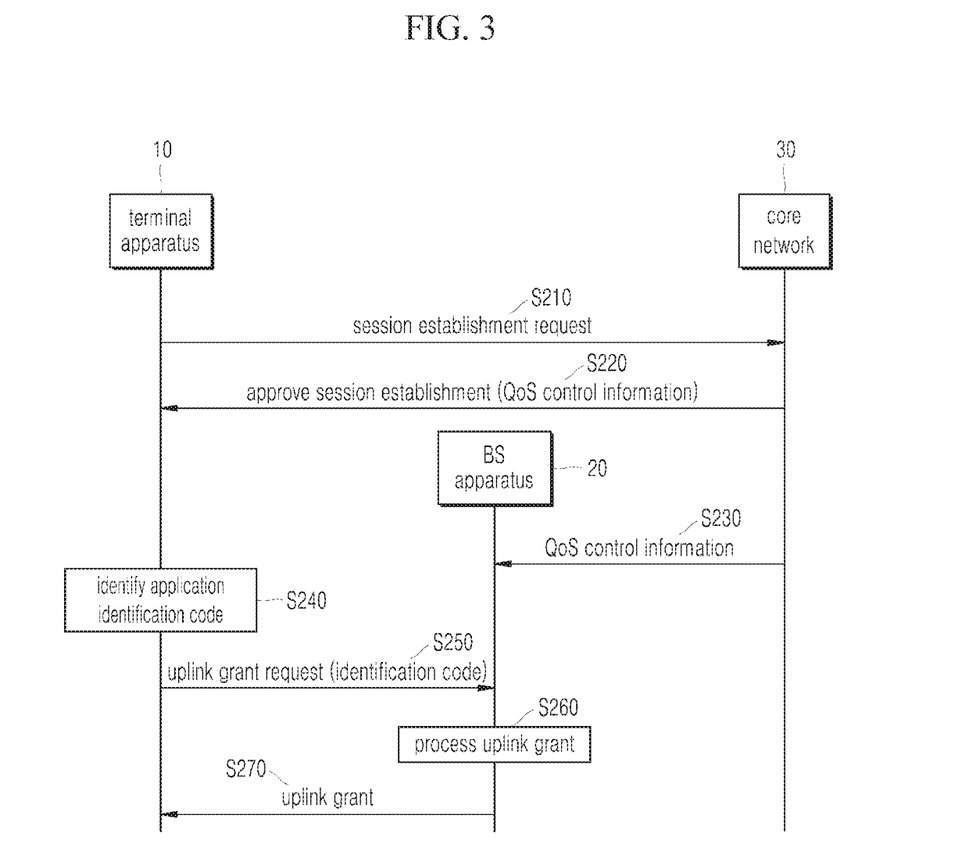
FIG. 3 is a flowchart illustrating a QoS control method using an application identification code according to an embodiment of the present disclosure.

An operation flow in the QoS control method using the application identification code according to an embodiment of the present disclosure will be described below with reference to FIG. 3.

First, the terminal apparatus 10 acquires QoS control information for an initial service flow from the core network 30 in a process of establishing a session with the core network 30 in steps S210 and S220.

As described above, the QoS control information acquired by the terminal apparatus 10 includes, for example, a mapping table or a hash function which can replace the application identification information (APP ID) with the identification code.

At this time, the BS apparatus 20 may acquire QoS control information for the initial service flow from the core network 30 in step S230, and the QoS control information acquired by the BS apparatus 20 may include, for example, the application identification code and the level of the application identified by each identification code.

Further, when a service flow for transmitting an uplink packet is initially generated in a particular application, the terminal apparatus 10 identifies the particular application and identifies an identification code which replaces identification information of the particular application with reference to the mapping table or the hash function in step S240.

Thereafter, the terminal apparatus 10 transmits an uplink grant request including the replaced/identified identification code to the BS apparatus 20 in step S250.

The BS apparatus 20 receiving the uplink grant request identifies the level of the particular application corresponding to the identification code received from the terminal apparatus 10 and processes the uplink grant on the basis of a priority according to the identified level of the application in steps S260 and S270.

As described above, through the QoS control method using the identification code according to an embodiment of the present disclosure, the uplink grant is processed according to the priority for each application determined by QoS control information, so that QoS control can be differentially performed between service flows. Further, resource use efficiency can be maximized by applying the identification code with a short length (small size), which replaces application identification information required for the QoS control for an initial service request. In addition, it is possible to prevent a QoS control policy from being exposed to the outside since the application level is not transmitted to the terminal apparatus 10.

Hereinafter, the configuration of the terminal apparatus 10 and the BS apparatus 20 for realizing the service flow-based QoS control method proposed by an embodiment of the present disclosure will be described in detail.

Prior to a detailed description, the QoS control information according to an embodiment of the present disclosure may be divided into QoS control information for processing an initial service flow generated according to a service request and QoS control information inserted (marked) into a downlink header according to the reflective QoS control method.

However, hereinafter, for convenience of description, the former QoS control information (the QoS control information for processing the initial service flow) is referred to as "first QoS control information" and the latter QoS control information (the QoS control information inserted (marked) into the downlink header) is referred to as "second QoS control information".

Figure 4:
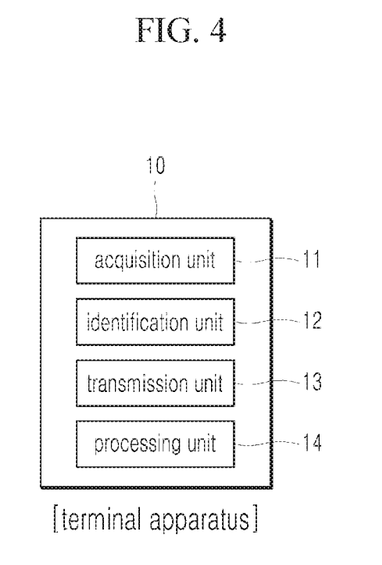
FIG. 4 is a block diagram illustrating a configuration of a terminal apparatus according to an embodiment of the present disclosure.

First. FIG. 4 illustrates the configuration of the terminal apparatus 10 according to an embodiment of the present disclosure.

As illustrated in FIG. 4, the terminal apparatus 10 according to an embodiment of the present disclosure may include an acquisition unit 11 configured to acquire first QoS control information, an identification unit 12 configured to identify an identification code from the first QoS control information, and a transmission unit 13 configured to transmit an uplink grant request.

Further, the terminal apparatus 10 according to an embodiment of the present disclosure may further include a processing unit 14 configured to process second QoS control information as well as the above-described elements.

All or at least some of the elements of the terminal apparatus 10 including the acquisition unit 11, the identification unit 12, the transmission unit 13, and the processing unit 14 may be implemented in the form of a software module, a hardware module, or a combination of a software module and a hardware module.

The software module may be understood as, for example, instructions executed by the processor that performs calculations within the terminal apparatus 10, and the instructions may have the form of being installed in a memory within the terminal apparatus 10.

As a result, the terminal apparatus 10 according to an embodiment of the present disclosure makes the service flow-based QoS control possible through the above elements and, hereinafter, each element within the terminal apparatus 10 therefor will be described in more detail.

The acquisition unit 11 performs a function for acquiring first QoS control information.

More specifically, the acquisition unit 11 acquires the first QoS control information from the core network 30 according to establishment of a session with the core network 30.

As described above, the first QoS control information acquired from the core network 30 includes a mapping table or a hash function which can replaces identification information of each application with an identification code.

At this time, the BS apparatus 20 also acquires the first QoS control information for the QoS control of the initial service flow from the core network 30.

As described above, the QoS control information acquired by the BS apparatus 20 may include application identification code and the level of the application identified by each identification code.

The identification unit 12 performs a function of identifying the application identification code.

More specifically, when a service flow for transmitting an uplink packet in a particular application is initially generated, the identification unit 12 identifies the particular application that generates the service flow and identifies an identification code which replaces identification information of the particular application identified with reference to a mapping table or a hash function within a first QoS.

The transmission unit 13 performs a function of transmitting an uplink grant request.

More specifically, when the identification code of the particular application that initially generates the service flow is identified, the transmission unit 13 transmits the uplink grant request including the identified identification code to the BS apparatus 20 and makes a request for scheduling and resource allocation for uplink packet transmission.

The BS apparatus 20 identifies a level of the particular application corresponding to the identification code received from the terminal apparatus 10 according to the uplink grant request and processes the uplink grant with a priority according to the identified level.

The processing unit 14 performs a function of processing second QoS control information.

More specifically, when second QoS control information is acquired from a header of the downlink packet received from the BS apparatus 20 in the same service flow after uplink packet transmission according to uplink grant processing, the processing unit 14 applies a particular QoS parameter identified from the acquired second QoS control information to the service flow and thus performs transmission of an uplink packet in a subsequent service flow with a QoS according to the particular QoS parameter.

That is, the processing unit 14 may apply, to the uplink packet in the same service flow, the same QoS parameter as that of the downlink packet through the use of the second QoS control information included in the header of the downlink packet so as to process the uplink grant with the same priority.

At this time, the acquisition unit 11 supports acquisition of the second QoS control information from the header of the downlink packet received from the BS apparatus 20 and the identification unit 12 supports identification of the particular QoS parameter applied to the downlink packet from the second QoS control information.

The terminal apparatus 10 according to another embodiment of the present includes an acquisition unit configured to acquire control information from a core network, an identification unit configured to identify information related to a particular application from the control information when a service flow for transmitting an uplink packet in the particular application is initially generated; and a transmission unit configured to transmit an uplink grant request including the information related to the particular application to a Base Station (BS) apparatus, thereby allowing the BS apparatus to process the uplink grant based on the information related to the particular application.

The control information may comprise at least one of mapping information for mapping identification information of an application to a priority of the application and replacing information for replacing the identification information of the application into a substitution code within a threshold size.

The information related to the particular application may comprise at least one of a priority of the particular application and a substitution code of the particular application within the threshold size.

The priority of the particular application may be identified from the identification information of the particular application using the mapping information of the control information, and the substitution code of the particular application may be identified by replacing the identification information of the particular application into the substitution code of the particular application using the replacing information of the control information.

As described above, with respect to a initially generated service flow, the terminal apparatus 10 according to an embodiment of the present disclosure processes an uplink grant according to a priority for each application and applies, to an uplink packet in the same service flow, the same QoS parameter as that of the downlink packet to process an uplink grant with the same priority.

Accordingly, the terminal apparatus 10 according to the present disclosure can perform the service flow-based QoS control without an increase in complexity compared to the existing bearer-based QoS control method and also apply the short (small) identification code which replaces application identification information required for the QoS control of the initial service request so as to maximize resource use efficiency.

Hereinafter, the configuration of the BS apparatus 20 according to an embodiment of the present disclosure will be described with reference to FIG. 5.

Figure 5:
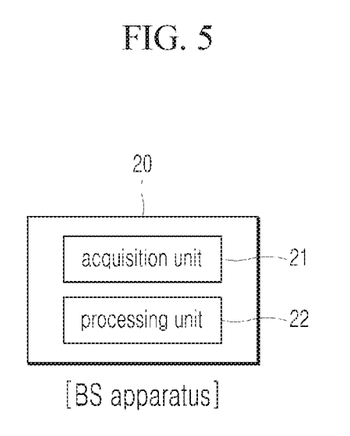
FIG. 5 is a block diagram illustrating a configuration of a BS apparatus according to an embodiment of the present disclosure.

As illustrated in FIG. 5, the BS apparatus 20 according to an embodiment of the present disclosure may include an acquisition unit 21 configured to acquire first QoS control information and a processing unit 22 configured to process an uplink grant request from the terminal apparatus 10 and second QoS control information.

All or at least some of the elements of the BS apparatus 20 including the acquisition unit 21 and the processing unit 22 may be implemented in the form of a software module, a hardware module, or a combination of a software module and a hardware module.

The software module may be understood as, for example, instructions executed by the processor that performs calculations within the BS apparatus 20, and the instructions may have the form of being installed in a memory within the BS apparatus 20.

As a result, the BS apparatus 20 according to an embodiment of the present disclosure makes the service flow-based QoS control possible through the above-described elements, and each element within the BS apparatus 20 therefore will be described in more detail.

The acquisition unit 21 performs a function of acquiring first QoS control information.

More specifically, the acquisition unit 21 acquires first QoS control information from the core network 30 according to establishment of a session between the terminal apparatus 10 and the core network 30 by the terminal apparatus 10.

As described above, the first QoS control information acquired from the core network 30 may include an identification code of an application which replaces application identification information and a level of the application identified by each identification code.

At this time, the terminal apparatus 10 also acquires the first QoS control information for a QoS control of an initial service flow from the core network 30.

As described above, the QoS control information which the terminal apparatus 10 acquires may include a mapping table or a hash function which can replace application identification information with a short (small) application identification code.

The processing unit 22 performs a function of processing an uplink grant request.

More specifically, when, as a service flow for transmitting an uplink packet in a particular application is initially generated by the terminal apparatus 10, an uplink grant request including an identification code of the particular application identified from first QoS control information is received from the terminal apparatus 10, the processing unit 22 processes an uplink grant on the basis of a priority according to an application level identified by the identification code of the particular application within the first QoS control information.

At this time, when a service flow for transmitting an uplink packet in a particular application is initially generated, the terminal apparatus 10 identifies the particular application that generates the service flow, identifies an identification code, which replaces identification information of the particular application identified with reference to a mapping table or a hash function within first QoS, and transmits an uplink grant request including the identified identification code to the BS apparatus 20 so as to make a request for scheduling and resource allocation for uplink packet transmission.

Further, the processing unit 22 performs a function of processing second QoS control information.

More specifically, when second QoS control information is acquired from a header of the downlink packet received from the core network 30 in the same service flow after uplink packet transmission according to uplink grant processing, the processing unit 22 applies a particular QoS parameter identified from the acquired second QoS control information to the service flow and thus performs transmission of the downlink packet to the terminal apparatus with a QoS according to the particular QoS parameter.

At this time, the processing unit 22 inserts the second QoS control information into the header of the downlink packet transmitted to the terminal apparatus 10 and thus allows the uplink packet to be transmitted with the same QoS as that of the downlink packet according to the particular QoS parameter identified from the second QoS control information when the terminal apparatus 10 receiving the downlink packet transmits the uplink packet in the same service flow.

That is, the processing unit 22 uses the second QoS control information included in the header of the downlink packet so as to process the uplink grant with the same priority by applying, to the uplink packet in the same service flow, the same QoS parameter as that of the downlink packet.

As described above, with respect to a initially generated service flow, the BS apparatus 20 according to an embodiment of the present disclosure processes an uplink grant according to a priority for each application and applies, to an uplink packet in the same service flow, the same QoS parameter as that of the downlink packet to process an uplink grant with the same priority.

Accordingly, the terminal apparatus 20 according to the present disclosure can perform the service flow-based QoS control without an increase in complexity compared to the existing bearer-based QoS control method and also apply the short (small) identification code which replaces application identification information required for the QoS control of the initial service request so as to maximize resource use efficiency.

Further, according to the present disclosure, it is possible to prevent the QoS control policy from being exposed to the outside by not transmitting the application level to the terminal apparatus 10.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A terminal apparatus comprising a processor, wherein the processor is configured to:
    acquire first Quality of Service (QoS) control information from a core network according to establishment of a session with the core network;
    identify an identification code of a particular application from the first QoS control information when a service flow for transmitting an uplink packet in the particular application is initially generated; and
    transmit an uplink grant request including the identification code of the particular application to a Base Station (BS) apparatus, thereby allowing the BS apparatus to process the uplink grant based on a priority of an application level identified by the identification code of the particular application.

2. The terminal apparatus of claim 1, wherein the identification code of the particular application includes a substitution code which replaces identification information (APP ID) predefined for the particular application with a code value within a threshold size.

3. The terminal apparatus of claim 1, wherein the processor is configured to, when second QoS control information is acquired from a header of a downlink packet received from the BS apparatus in connection with the service flow, apply a particular QoS parameter identified from the second QoS control information to the service flow to allow an uplink packet in the service flow to be transmitted with a QoS according to the particular QoS parameter.

4. A Base Station (BS) apparatus comprising a processor, wherein the processor is configured to:
    acquire first Quality of Service (QoS) from a core network according to establishment of a session between a terminal apparatus and the core network; and
    when an uplink grant request including an identification code of a particular application is received from the terminal apparatus according to a service flow for transmitting an uplink packet of the particular application being initially generated by the terminal apparatus, process the uplink grant based on a priority according to an application level identified by the identification code of the particular application within the first QoS control information.

5. The BS apparatus of claim 4, wherein the identification code of the particular application includes a substitution code which replaces identification information (APP ID) predefined for the particular application with a code value within a threshold size.

6. The BS apparatus of claim 4, wherein, when second QoS control information is acquired from a header of a downlink packet received from the core network in connection with the service flow, the processor is configured to apply a particular QoS parameter identified from the second QoS control information to the service flow to allow the downlink packet to be transmitted to the terminal apparatus with a QoS according to the particular QoS parameter.

7. The BS apparatus of claim 6, wherein the processor is configured to insert the second QoS control information into the header of the downlink packet to be transmitted to the terminal apparatus, thereby allowing the terminal apparatus to transmit the uplink packet in the service flow with the QoS according to the particular QoS parameter.

8. A method of controlling a QoS, the method comprising:
    acquiring first Quality of Service (QoS) control information from a core network according to establishment of a session with the core network by a terminal apparatus;
    identifying an identification code of a particular application from the first QoS control information by the terminal apparatus when a service flow for transmitting an uplink packet in the particular application is initially generated; and
    transmitting an uplink grant request including a QoS parameter of the particular application to a Base Station (BS) apparatus, thereby allowing the BS apparatus to process the uplink grant based on a priority according to an application level identified by the identification code of the particular application by the terminal apparatus.

9. The method of claim 8, wherein the identification code of the particular application includes a substitution code which replaces identification information (APP ID) predefined for the particular application with a code value within a threshold size.

10. The method of claim 8, further comprising applying, when second QoS control information is acquired from a header of a downlink packet received from the BS apparatus in connection with the service flow, a particular QoS parameter identified from the second QoS control information to the service flow to allow the uplink packet in the service flow to be transmitted with a QoS according to the particular QoS parameter by the terminal apparatus.

11. A method of controlling a QoS, the method comprising:
acquiring first Quality of Service (QoS) control information from a core network according to establishment of a session between a terminal apparatus and the core network by a Base Station (BS) apparatus;
receiving, when a service flow for transmitting an uplink packet of a particular application is initially generated by the terminal apparatus, an uplink grant request including an identification code of the particular application from the terminal apparatus by the BS apparatus; and
processing the uplink grant based on a priority according to an application level identified by the identification code of the particular application within the first QoS control information by the BS apparatus.

12. The method of claim 11, wherein the identification code of the particular application includes a substitution code which replaces identification information (APP ID) predefined for the particular application with a code value within a threshold size.

13. The method of claim 11, further comprising transmitting, when second QoS control information is acquired from a header of a downlink packet received from the core network in connection with the service flow, the downlink packet to the terminal apparatus with a QoS according to a particular QoS parameter by applying the particular QoS parameter identified from the second QoS control information to the service flow by the BS apparatus.

14. The method of claim 13, wherein the transmitting comprises inserting the second QoS control information into the header of the downlink packet to be transmitted to the terminal apparatus, thereby allowing the terminal apparatus to transmit the uplink packet in the service flow with the QoS according to the particular QoS parameter.

15. A terminal apparatus comprising a processor, wherein the processor is configured to:
acquire control information from a core network;
identify information related to a particular application from the control information when a service flow for transmitting an uplink packet in the particular application is initially generated; and
transmit an uplink grant request including the information related to the particular application to a Base Station (BS) apparatus, thereby allowing the BS apparatus to process the uplink grant based on the information related to the particular application.

16. The terminal apparatus of claim 15, wherein the control information comprises at least one of mapping information for mapping an identification information of an application to a priority of the application and replacing information for replacing the identification information of the application into a substitution code within a threshold size.

17. The terminal apparatus of claim 16, wherein the information related to the particular application comprises at least one of a priority of the particular application and a substitution code of the particular application within the threshold size.

18. The terminal apparatus of claim 17, wherein the priority of the particular application is identified from the identification information of the particular application using the mapping information of the control information, and the substitution code of the particular application is identified by replacing the identification information of the particular application into the substitution code of the particular application using the replacing information of the control information.

* * * * *